(12) United States Patent
Mizusawa et al.

(10) Patent No.: US 11,853,027 B2
(45) Date of Patent: Dec. 26, 2023

(54) DEVICE INCLUDING DATA TRANSMISSION MECHANISMS WHICH TRANSMIT DRIVING STATE OF DRIVE DEVICE

(71) Applicant: FANUC CORPORATION, Yamanashi (JP)

(72) Inventors: Kazuyasu Mizusawa, Yamanashi (JP); Yuji Sone, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 611 days.

(21) Appl. No.: 16/736,979

(22) Filed: Jan. 8, 2020

(65) Prior Publication Data

US 2020/0225635 A1 Jul. 16, 2020

(30) Foreign Application Priority Data

Jan. 15, 2019 (JP) ................................. 2019-004709

(51) Int. Cl.
*G05B 19/25* (2006.01)
*G06F 16/28* (2019.01)
*G06F 16/2455* (2019.01)
*H02P 6/18* (2016.01)

(52) U.S. Cl.
CPC ..... *G05B 19/253* (2013.01); *G06F 16/24564* (2019.01); *G06F 16/284* (2019.01); *H02P 6/181* (2013.01)

(58) Field of Classification Search
CPC .................. G05B 19/253; G06F 16/284; G06F 16/24564; H02P 6/181
See application file for complete search history.

(56) References Cited

U.S. PATENT DOCUMENTS

| | | | | |
|---|---|---|---|---|
| 8,952,636 B2* | 2/2015 | Tateda | ................... | G08C 19/00 |
| | | | | 318/449 |
| 2016/0344267 A1* | 11/2016 | Ogawa | ...................... | H02P 6/16 |
| 2020/0133227 A1* | 4/2020 | Mikado | ................ | G05B 19/404 |
| 2023/0124017 A1* | 4/2023 | Mergener | .............. | B25B 21/008 |
| | | | | 318/139 |

FOREIGN PATENT DOCUMENTS

| | | |
|---|---|---|
| JP | S60135902 U | 9/1985 |
| JP | S6336306 A | 2/1988 |
| JP | H08320713 A | 12/1996 |

(Continued)

*Primary Examiner* — Zoheb S Imtiaz
(74) *Attorney, Agent, or Firm* — HAUPTMAN HAM, LLP

(57) ABSTRACT

A machine tool includes three mutually independent data transmission mechanisms. The data transmission mechanisms include respective transmission units which assign codes for detecting errors to data acquired from the output of sensors, and which transmit the data. A machine controller includes an operation judgment unit which judges whether operation of a feed axis motor is continued. The operation judgment unit judges that operation is continued when there are two pieces of data for which a relationship between the data and the code matches a rule, and the two pieces of data are within a predetermined judgment range. The operation judgment unit judges that the feed axis motor is stopped when at least one of the pieces of data for which the relationship matches the rule deviates from the judgment range.

5 Claims, 6 Drawing Sheets

(56) References Cited

FOREIGN PATENT DOCUMENTS

| | | |
|---|---|---|
| JP | H11249703 A | 9/1999 |
| JP | 2003346273 A | 12/2003 |
| JP | 2007026010 A | 2/2007 |
| JP | 2010152595 A | 7/2010 |
| JP | 2016103110 A | 6/2016 |
| JP | 2016217950 A | 12/2016 |

* cited by examiner

DEVICE INCLUDING DATA TRANSMISSION MECHANISMS WHICH TRANSMIT DRIVING STATE OF DRIVE DEVICE

RELATED APPLICATIONS

The present application claims priority of Japanese Application Number 2019-004709, filed on Jan. 15, 2019, the disclosure of which is hereby incorporated by reference herein in its entirety.

BACKGROUND OF THE INVENTION

1. Field of the Invention

The present invention relates to a device including data transmission mechanisms which transmit driving state of a drive device.

2. Description of the Related Art

In the prior art, it is known that when communication data such as output values of a sensor is transmitted from one device to another device, in some cases, some of the data may be corrupted due to the influence of noise or the like. For example, information regarding some of the bits included in the communication data may be lost. Thus, the execution of control in electrical circuits which transmit data to determine whether received communication data is correct is known. In this control, a code associated with the communication data is assigned to the communication data, and the communication data is transmitted. Determining whether the association between the data and the code matches a predetermined rule when the communication data is received is known (refer to, for example, Japanese Unexamined Patent Publication No. 8-320713A). If the relationship between the communication data and the code does not match the predetermined rule, it can be determined that at least a part of the communication data or the code is corrupted.

Furthermore, in the prior art, codes which function to correct communication data when it is determined that the communication data is erroneous are known. The assignment of such codes to communication data and the transmission of the communication data is known. When the communication data is erroneous, the communication data can be repaired based on the code.

Circuits which transmit data include circuits which transmit important signals. For example, data for controlling a device which maintains the safety of an operator may be transmitted as the communication data in some cases. The arrangement of a plurality of circuits which transmit the same data when such important data is transmitted is known. Specifically, the multiplexing of circuits which transmit data is known (refer to, for example, Japanese Unexamined Patent Publication No. 2007-26010A).

SUMMARY OF THE INVENTION

By forming a plurality of circuits which transmit data on a device, when accurate data cannot be transmitted by a single circuit which transmits data, accurate data can be transmitted by another circuit which transmits data. For example, when an abnormality occurs in a drive device which drives the components of a device, the abnormality of the drive device cannot be transmitted due to the malfunction of a single circuit in some cases. In this case, by transmitting the abnormality of the drive device with another circuit, the drive device can be stopped.

In devices in which the circuit which transmits data is multiplexed, data which has been assigned a code for detecting and correcting errors of the data can be transmitted. In the prior art, when a plurality of circuits which transmit data are included, in the case in which data of at least one of the circuits which deviates from a desired judgement range is received, control for stopping the device is executed. In other words, when at least one piece of data indicates an abnormal value, control for stopping the device can be performed regardless of whether the relationship between the code assigned to the data and the data matches the rule.

In some cases, the values of the data may be changed in the path in which the data is transmitted due to the influence of noise or the like. In some cases, an abnormality may not occur in the device to be monitored, such as a drive device, but rather the data may be corrupted in the path in which the data is transmitted. For example, when sensor output is transmitted through communication lines, the values of the data may be erroneous in some cases due to the influence of noise or the like. In this case, even if the driving state of the drive device is normal, it is determined that the driving state of the drive device is abnormal and the device is stopped. As a result, there is a problem in that the utilization rate of the device is reduced.

The device according to an aspect of the present disclosure includes at least three mutually independent data transmission mechanisms which transmit a driving state of a drive device which drives a component of the device, and a controller which controls driving of the drive device. Each of the data transmission mechanisms includes a sensor which acquires a variable related to the driving state of the driving device, a transmission unit which assigns a code for detecting an error to data acquired from output of the sensor and transmits the data, and a reception unit which receives the data to which the code for detecting the error has been assigned. The controller includes a data judgment unit which determines whether a relationship between the data and the code for detecting the error in the data transmitted from the data transmission mechanism matches a predetermined rule. The controller further includes an operation judgment unit which executes operation judgment control for judging whether operation of the drive device should be continued. The operation judgment control includes, in the case in which there is data for which the relationship between the data and the code for detecting the error does not match the rule, control in which it is judged that operation is continued when there are at least two pieces of data for which the relationship between the data and the code for detecting the error matches the rule and all of the at least two pieces of data are within a predetermined judgement range. The operation judgment control further includes control in which it is determined that the drive device is stopped when at least one of the pieces of data for which the relationship between the data and the code for detecting the error matches the rule deviates from the judgment range.

BRIEF DESCRIPTION. OF THE DRAWINGS

DETAILED DESCRIPTION

The device according to an embodiment will be described with reference to FIG. 1 to FIG. 6. In the present embodiment, a machine tool will be described as an example of the device. The device according to the present embodiment includes data transmission mechanisms which transmit the driving state of a drive device.

Figure 1:
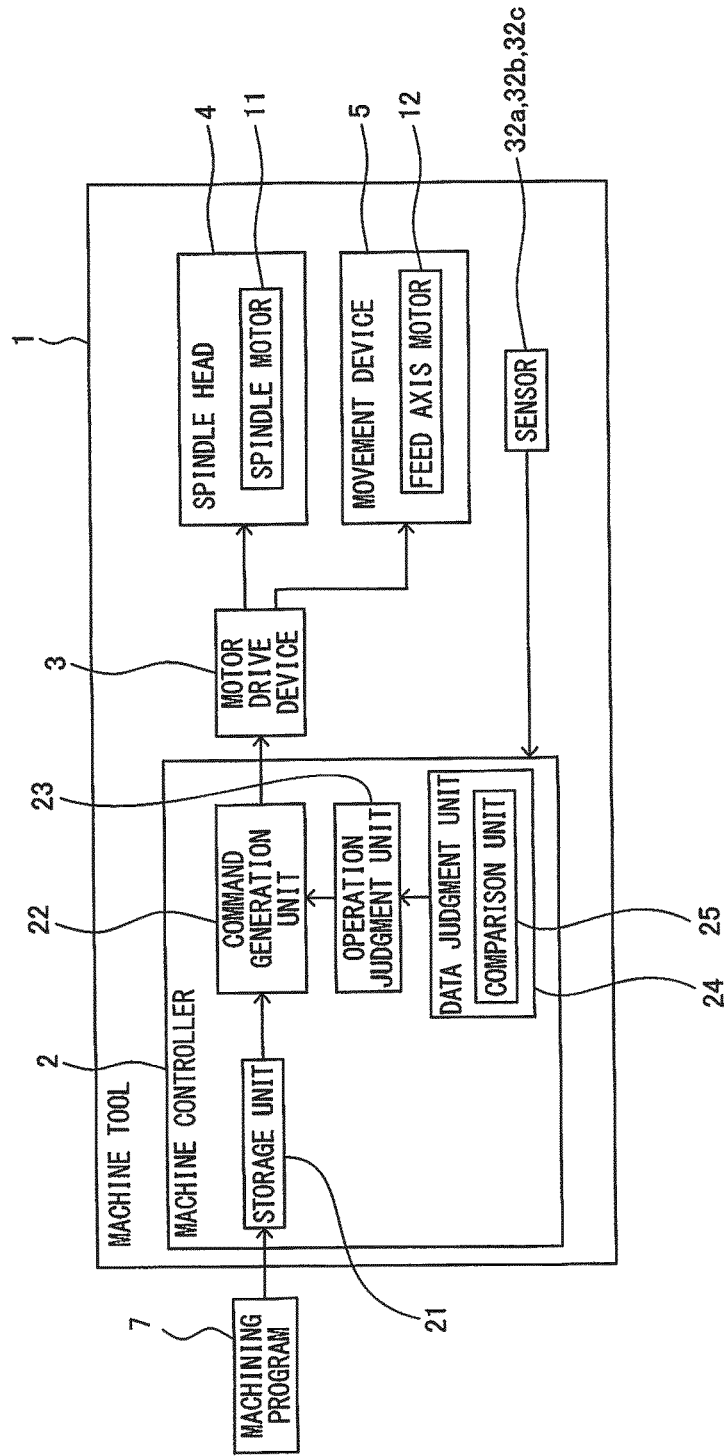
FIG. 1 is a block diagram of a machine tool according to an embodiment.

FIG. 1 is a block diagram of the machine tool according to the present embodiment. The machine tool 1 machines a workpiece while changing the position of a tool relative to the workpiece. The machine tool 1 includes feed axes for changing the position of the tool relative to the workpiece. For example, the feed axes may be constituted by three linear axes (X-axis, Y-axis, and Z-axis). The feed axes of the machine tool 1 are not limited to this form, and the feed axes can be constituted by any linear axes or rotary axes.

The machine tool 1 includes a movement device 5 which moves at least one of the workpiece and the tool along the feed axes. The movement device 5 includes feed axis motors 12 arranged corresponding to the respective feed axes. The machine tool 1 includes a spindle head 4 which rotates the tool while supporting the tool. The spindle head 4 includes a spindle which supports the tool, and a spindle motor 11 which rotates the spindle.

The machine tool 1 includes a machine controller 2 as the controller which controls the feed axis motors 12 and the spindle motor 11. The machine controller 2 according to the present embodiment may be constituted by an arithmetic processing device (computer) including a CPU (Central Processing Unit) serving as a processor. The machine controller 2 includes RAM (Random Access Memory) and ROM (Read-Only Memory) which are connected to the CPU via busses.

The machine tool 1 according to the present embodiment is of a numerical control type. A machining program 7 which operates the machine tool 1 is generated in advance by an operator. The machine controller 2 includes a storage unit 21 which stores information related to machining such as the machining program 7 and judgment ranges, and a command generation unit 22 which generates operation commands for the motors based on the machining program 7. The storage unit 21 can be constituted by recording medium which is capable of storing information such as a volatile memory, nonvolatile memory, or hard disk. The command generation unit 22 corresponds to the processor which is driven in accordance with the machining program 7. The command generation unit 22 is formed so as to be capable of reading the information stored in the storage unit 21. The processor functions as the command generation unit 22 by reading the machining program 7 and performing the control defined in the machining program 7.

The machine tool 1 includes a motor drive device 3 including electrical circuits which supply electricity to the feed axis motors 12 and the spindle motor 11. The motor drive device 3 supplies electricity to the feed axis motors 12 and the spindle motor 11 based on the operation commands generated by the command generation unit 22. The feed axis motor 12 and the spindle motor 11 are driven as a result of the supply of electricity by the motor drive device 3.

Figure 2:
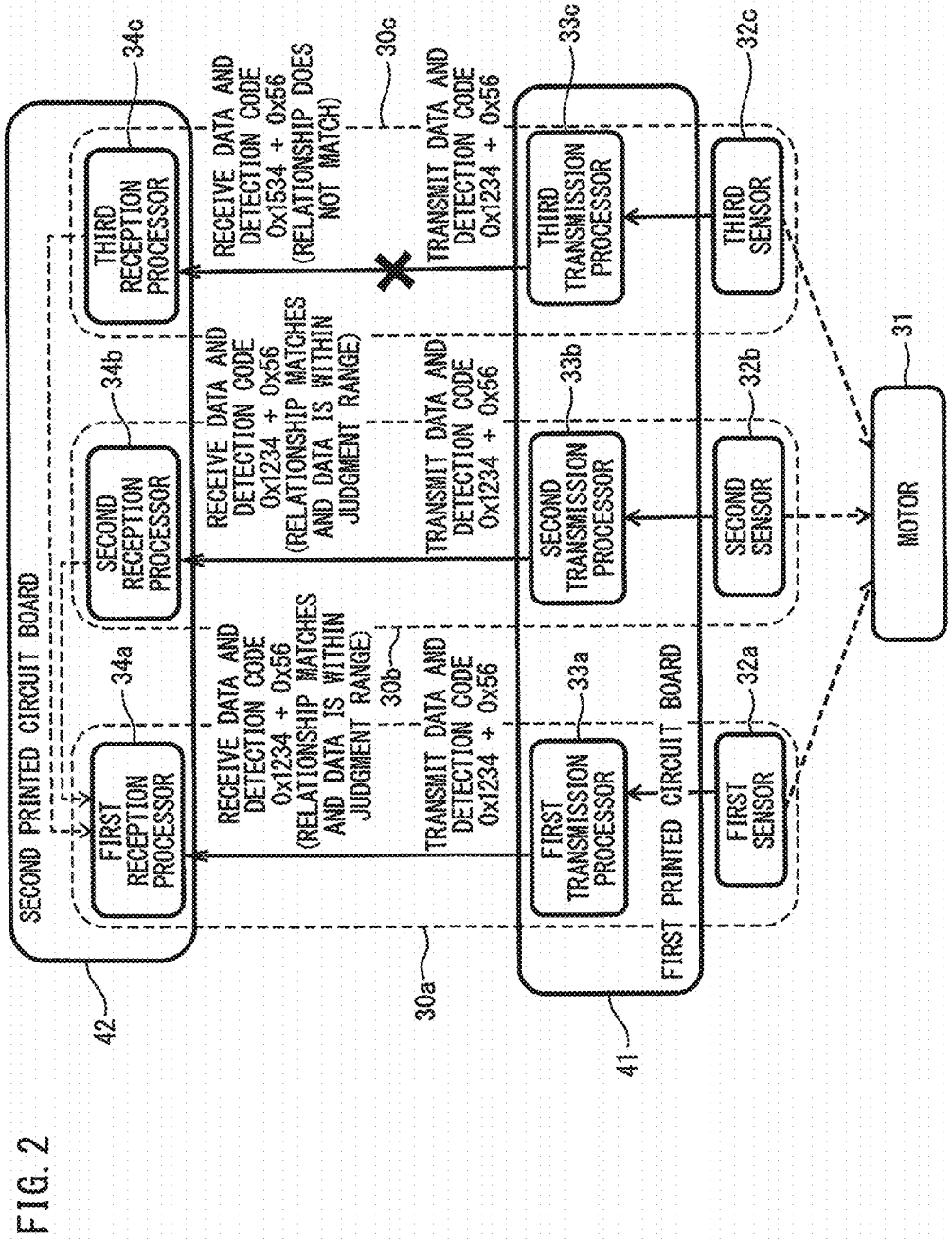
FIG. 2 is a schematic diagram for illustrating the data transmission mechanisms according to the embodiment.

FIG. 2 is a schematic diagram of the data transmission mechanisms according to the present embodiment. In the example shown in FIG. 2, motor 31 represents the drive device which drives the component of the device. Referring to FIG. 1 and FIG. 2, the motor 31 is, for example, a feed axis motor 12 of the movement device 5. The feed axis motor 12 may be, for example, a motor which moves a table to which the workpiece is secured, or may be a motor which moves a member to which the spindle head 4 is secured. In the present embodiment, a motor which moves a table will be described as an example.

The drive device which drives the component of the device is not limited to a motor, and any mechanism which moves or rotates the component of the device can be used as the drive device. For example, in addition to a motor, the drive device may be a cylinder which is pneumatically or hydraulically driven.

The machine tool 1 according to the present embodiment includes sensors which acquire variables related to the driving state of the drive device. In the present example, a first sensor 32a, a second sensor 32b, and a third sensor 32c, which detect variables related to the rotational speed of the motor 31, are provided. The driving state of the drive device is determined based on the output values of the plurality of sensors 32a, 32b, 32c.

In order to detect variables related to the driving state of the drive device, different types of sensors can be arranged. In the present embodiment, the sensors 32a, 32b, 32c acquire variables related to the rotational speed of the motor 31. For example, an encoder which is attached to the rotary shaft of the motor and which detects the rotation number of the rotary shaft can be used as a sensor. Furthermore, a linear scale which is arranged along a rail for moving the table, and which detects the position of the table or a non-contact sensor which optically detects the position of the table, etc., can be used.

The same type of sensor may be used as the first sensor 32a, the second sensor 32b, and the third sensor 32c. For example, three encoders which detect the rotational speed of the motor 31 may be attached to the rotary shaft of the motor 31. The sensors 32a, 32b, 32c can mutually independently acquire variables related to the rotational speed of the motor 31. Further, the rotational speed of the motor 31 can be calculated from the acquired values.

The driving state of the drive device is not limited to the rotational speed, and any driving state such as temperature, pressure, magnitude of vibration, torque, or sound level can be used as the driving state of the drive device. Any sensors which can detect the driving state of the drive device can be used as the sensors which acquire variables related to the driving state of the drive device. In addition to position detectors such as encoders and linear scales, temperature sensors which detect the temperature of a predetermined part of the drive device can be used as the sensor. Further, pressure sensors which detect pressure when the drive device is hydraulically or pneumatically driven, vibration sensors which detect vibration when the drive device is driven, torque sensors which detect the torque output by the drive device, or sound level sensors which detect abnormal sounds generated by the drive device can be used as the sensors.

The machine tool 1 according to the present embodiment includes three or more mutually independent data transmission mechanisms. The plurality of data transmission mechanisms mutually independently transmit communication data. In the example shown in FIG. 2, a first data transmission mechanism 30a, a second data transmission mechanism 30b, and a third data transmission mechanism 30c are provided. Each of the data transmission mechanisms includes a sensor which acquires a variable related to the rotational speed of the motor, a transmission processor serving as a transmission unit which transmits the acquired data based on the sensor output, and a reception processor serving as a reception unit which receives the data transmitted by the transmission processor. The first data transmission mechanism 30a includes the first sensor 32a, a first transmission processor 33a, and a first reception processor 34a. The second data transmission mechanism 30b includes the second sensor 32b, a second transmission processor 33b, and a second reception processor 34b. The third data transmission mechanism 30c includes the third sensor 32c, a third transmission processor 33c, and a third reception processor 34c.

Each of the transmission processors 33a, 33b, 33c may have function for converting the output of the sensor into the predetermined variable. For example, the transmission processors 33a, 33b, 33c may have functions for converting the position signals acquired from the linear scales, which detect the position of the table, into the rotational speed of the motor. In the present example, the transmission processors 33a, 33b, 33c acquire the rotational speed of the motor 31 based on the outputs of the sensors 32a, 32b, 32c, and transmit the rotational speed of the motor 31 as the data.

The transmission processors 33a, 33b, 33c assign codes for detecting errors to the data acquired from the outputs of the respective sensors 32a, 32b, 32c, and transmit the data. For example, the transmission processors 33a, 33b, 33c assign error detection codes for determining whether there are errors in the data such as a such as CRC (Cyclic Redundancy Check) codes or parity bits.

The reception processors 34a, 34b, 34c receive the data, to which the error detection codes for detecting errors has been assigned, generated by the transmission processors 33a, 33b, 33c. The first reception processor 34a is connected by communication line to the first transmission processor 33a. The second reception processor 34b is connected by communication line to the second transmission processor 33b. The third reception processor 34c is connected by communication line to the third transmission processor 33c. Though the reception units are connected to the tray emission units by communication lines in the present embodiment, the embodiment is not limited to this. The transmission units and reception units may be formed so as to be capable of wireless communication.

Thus, the data transmission mechanisms according to the present embodiment are configured as a single path until the variable based on the output of a single sensor reaches the reception processor. Each of the data transmission mechanisms transmits the data along an independent path from the sensor to the reception processor. Further, three or more data transmission mechanisms which transmit data related to a single driving state are provided.

The transmission unit and reception unit according to the present embodiment includes processors. The processor functions as the transmission unit by being driven based on the machining program. Furthermore, the processor functions as the reception unit by being driven based on the machining program. The transmission units and reception units are not limited to this form. Any devices which can assign codes for detecting errors to data can be used as the transmission units. Furthermore, it is sufficient that the reception units has functions to receive data to which the codes for detecting errors have been assigned. For example, the transmission units and reception units may be constituted by integrated circuits such as ASICs (Application Specific Integrated Circuits).

In the machine tool including the data transmission mechanisms shown in FIG. 2, the transmission processors 33a, 33b, 33c serving as transmission units are arranged on a single first printed circuit board 41. The first printed circuit board 41 is arranged in the vicinity of, for example, the first sensor 32a, the second sensor 32b, and the third sensor 32c. The reception processors 34a, 34b, 34c as reception units are arranged on a single second printed circuit board 42. The second printed circuit board 42 is arranged, for example, in the interior of the machine controller 2.

The error detection codes are formed so as to relate to the data. The individual transmission processors 33a, 33b, 33c generate error detection codes in accordance with predetermined rules based on the transmitted data. In the example shown in FIG. 2, in the data transmission mechanisms 30a, 30b, 30c, "0x1234" as the data is transmitted from the transmission processors 33a, 33b, 33c, respectively. In the present example, for example, data representing the rotational speed of the motor is transmitted. Furthermore, "0x56" is assigned to the data as an error detection code and the data is transmitted. It should be noted that when the driving state of the motor 31 is normal, the data transmitted from the transmission processors 33a, 33b, 33c may be the same values or values which are very close to each other.

The machine controller 2 according to the present embodiment includes a data judgment unit 24 which judges whether the error is included in the data transmitted by the data transmission mechanisms 30a, 30b, 30c. The data judgment unit 24 judges whether the data transmitted from the transmission processors 33a, 33b, 333c is corrupted due to the influence of noise or the like. The data judgment unit 24 includes a comparison unit 25 which determines whether the relationship between the data and the error detection code matches a predetermined rule. The comparison unit 25 determines that the data is erroneous when the relationship between the data and the error detection code does not match the predetermined rule.

In the present embodiment, the reception unit functions as the data judgment unit 24 and the comparison unit 25. Each of the reception processors 34a, 34b, 34c functions as the data judgment unit 24. In particular, the reception processors 34a, 34b, 34c function as the comparison unit 25 of the data judgment unit 24. The reception processor 34a, 34b, 34c functions as the data judgment unit 24 and the comparison unit 25 by being driven based on the machining program 7. The data judgment unit and comparison unit are not limited to these forms. In addition to processors which receive data, processors or integrated circuits, etc., which have functions which judge data may be used.

In the example shown in FIG. 2, the data to which the error detection code has been assigned transmitted from the first transmission processor 33a is identical to the data to which the error detection code has been assigned received by the first reception processor 34a. The first reception processor 34a judges that the relationship between the received data and the error detection code matches the rule. Thus, it can be determined that the data was not corrupted in the transmission path from the first transmission processor 33a to the first reception processor 34a due to the influence of noise or the like. In the second reception processor 34b, it is judged that the relationship between the data and the error detection code matches the rule, and that the data is not erroneous.

Conversely, the data transmitted from the third transmission processor 33c is corrupted in the transmission path from the third transmission processor 33c to the third reception processor 34c. For example, a part of the data is corrupted due to the influence of noise. The data "0x1534" received by the third reception processor 34 is different from the data "0x1234" transmitted by the third transmission processor 33c. The third reception processor 34, which functions as the comparison unit 25, compares the data and the error detection code, and determines that the relationship between the data and the error detection code does not match the predetermined rule. The third reception processor 34c determines that the data has an error.

Furthermore, the reception processors 34a, 34b, 34c as the data judgment unit 24 have functions for judging whether the data is within a predetermined judgment range. When the relationship between the data and the error detection code matches the rule, the reception processor 34a, 34b, 34c judges whether the data is within the predetermined judgment range. In the present example, the reception processor 34a, 34b, 34c judges whether the rotational speed of the motor 31 is within a predetermined judgment range of the rotational speed. The first reception processor 34a and the second reception processor 34b determine that the data is within the judgment range. The judgment range of the data is stored in the storage unit 21. It should be noted that the control for judging whether the data is within the judgment range may be performed by the operation judgment unit 23.

The machine controller 2 includes the operation judgment unit 23 which executes operation judgment control for judging whether operation of the drive device should be continued based on judgment results from the data judgment unit 24. In the present embodiment, the first reception processor 34a as a reception unit functions as the operation judgment unit 23. The first reception processor 34a functions as the operation judgment unit 23 by being driven based on the machining program 7. The operation judgment unit is not limited to this form. The device such as a processor or integrated circuit which judges whether operation of the drive device should be continued may be arranged separately from the reception processors.

The first reception processor 34a serving as the operation judgment unit 23 receives judgment results as to whether the relationship between the data and the error detection code matches the rule and judgment results as to whether the data is within the judgment range from the second reception processor 34b and the third reception processor 34c.

In the example shown in FIG. 2, information indicating that the relationship between the data and the error detection code does not match the rule is included in the output from the third reception processor 34c. In this case, the first reception processor 34a executes control without using the information received from the third reception processor 34c. In the case in which there is data for which the relationship between the data and the error detection code does not match the rule, the first reception processor 34a judges that operation should be continued when there are two or more sets of data for which the relationship between the data and the code for detecting errors matches the rule, and all of the two or more sets of data are within the predetermined judgment range. In the present example, the relationship between the data and the error code matches the rule in the two sets of data received by the first reception processor 34a and the second reception processor 34b, and the data is within the judgment range. Thus, the first reception processor 34a judges that operation of the motor 31 should continue.

The first reception processor 34a serving as the operation judgment unit 23 transmits a command for continuing the current operation state to the command generation unit 22. The command generation unit 22 continues the operation of the machine tool 1 based on the machining program 7.

Figure 3:
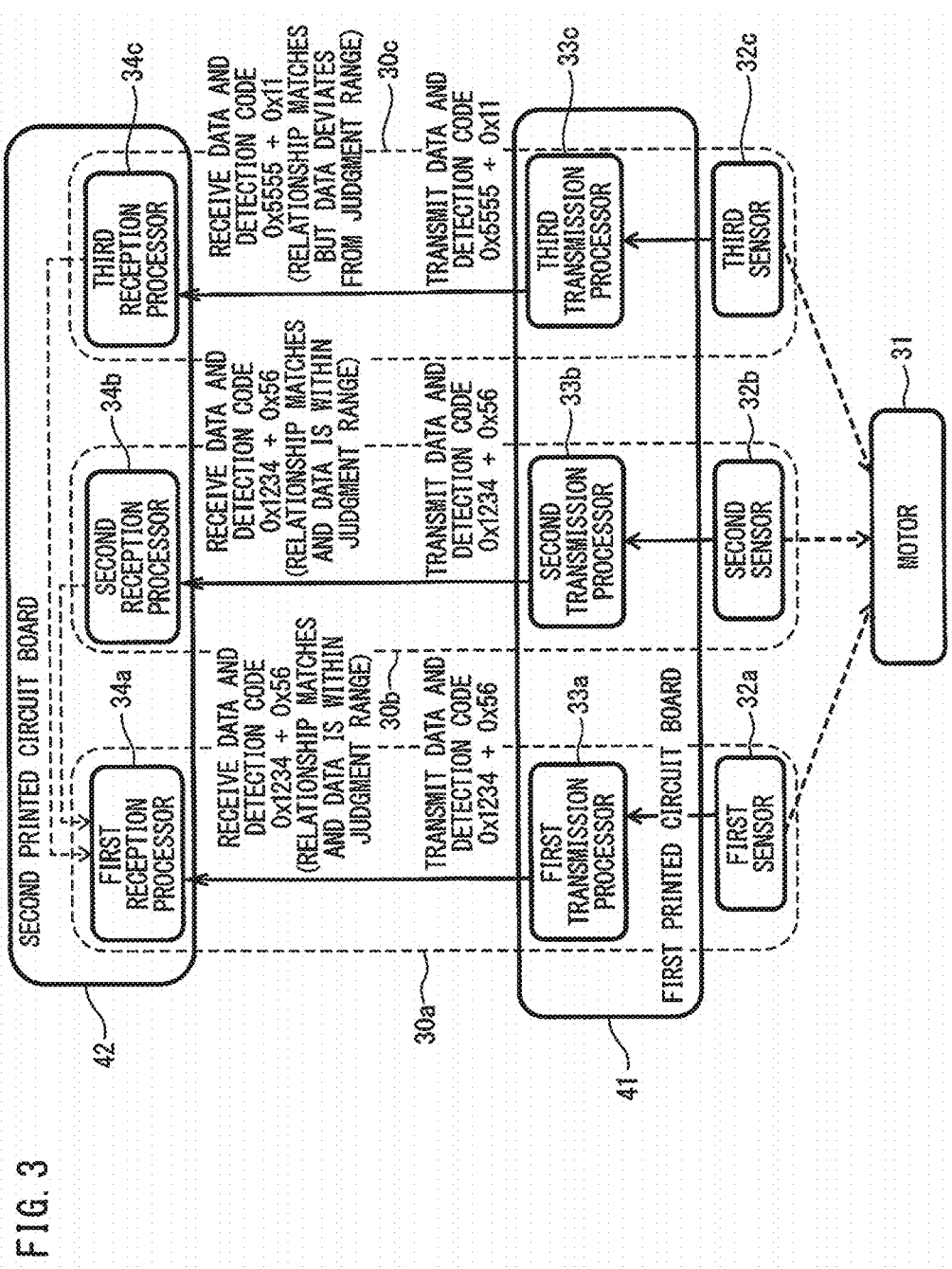
FIG. 3 is another schematic diagram for illustrating the data transmission mechanisms according to the embodiment.

FIG. 3 is another schematic diagram of the data transmission mechanisms according to the present embodiment. In the example shown in FIG. 3, the relationships between the data and the error detection codes match for the data received by the first reception processor 34a and the second reception processor 34b, and the data is within the judgment range. The relationship between the data and the error detection code matches the rule for the data to which the error detection code has been assigned received by the third reception processor 34c. However, the data (rotational speed) calculated based on the variable acquired by the third sensor 32c deviates from the judgment range. Furthermore, an abnormality did not occur in the third data transmission mechanism 30c. In this case, the data to which the error detection code has been assigned transmitted by the third transmission processor 33c and the data to which the error detection code has been assigned received by the third reception processor 34c are equal. The third reception processor 34c judges that the received data is not erroneous. Furthermore, the third reception processor 34c judges that the data deviates from the judgment range.

The first reception processor 34a serving as the operation judgment unit 23 receives judgment results from the second reception processor 34b and third reception processor 34c serving as data judgment units 24. When at least one of the sets of data for which the relationship between the data and the error detection code matches with the rule deviates from the judgment range, the first reception processor 34a judges that the motor 31 should be stopped. In the example shown in 3, the sets of data transmitted by the two data transmission mechanisms 30a, 30b are within the judgment range. Conversely, the data transmitted by the single data transmission mechanism 30c deviates from the judgment range, and thus, the first reception processor 34a determines that an abnormality has not occurred in the data transmission mechanisms 30a, 30b, 30c and that an abnormality has occurred in the motor 31. The first reception processor 34a transmits a command to stop the motor 31 to the command generation unit 22. The command generation unit 22 transmits the command for stopping the target feed axis motor 12, and the feed axis motor 12 stops. Alternatively, the command generation unit 22 may stop the spindle motor 11 and all of the feed axis motors 12 arranged in the machine tool 1. In other words, the machine tool 1 stops.

Thus, in the operation judgment control according to the present embodiment, even if it is judged that some of the data of the data transmission mechanisms is erroneous, as long as the data received by two or more of the data transmission mechanisms is free of errors, and the data is within the judgment range, it is determined that the driving state of the motor 31 is normal. It is then determined that an abnormality has occurred in a part of the data transmission mechanisms, and operation of the drive device is continued.

In the prior art, control for stopping the drive device is performed when at least one set of data deviates from the judgment range regardless of whether or not the relationship between the data and the error detection code matches a rule. Thus, when an abnormality occurs in a part of the data transmission mechanisms, the drive device is stopped in some cases. In connection thereto, in the present embodiment, it can be determined that an abnormality has occurred in a part of the plurality of data transmission mechanisms.

As a result, operation of the drive device is continued, whereby a reduction in the utilization rate of the drive device can be suppressed.

Furthermore, in the operation judgment control according to the present embodiment, since normality of the data received by the plurality of data transmission mechanisms is a criterion for continuation of operation, normality of the driving state of the drive device can be reliably judged. It should be noted that in the judgment of the operation judgment unit, even in the case in which the relationship between the data and the error detection code does not match the rule in a part of the data transmission mechanisms, as long as the data received by one of the data transmission mechanisms is normal, operation may continue.

In the operation judgment control according to the present embodiment, in the case in which the relationship between the data and the error detection code matches the rule and the data deviates from the judgment range in at least one set of data, the drive device is stopped. It can be determined that the data is not erroneous. Thus, in the case in which there is a risk that an abnormality will occur in the drive device, the drive device can be stopped.

The above operation control can be executed each time that the rotational speed of the motor is acquired based on the output of the sensors. Though three data transmission mechanisms 30a, 30b, 30c are provided in the present embodiment, the embodiment is not limited to this, and four or more data transmission mechanisms may be provided. Even in this case, the aforementioned operation judgment control can be executed. For example, in the case in which four data transmission mechanisms are provided, even when the relationships between the data transmitted by two data transmission mechanisms and the error detection codes do not match the rule, if the relationships between the data transmitted by the other two data transmission mechanisms and the codes match, and the data is within the judgment range, operation can be continued.

Figure 4:
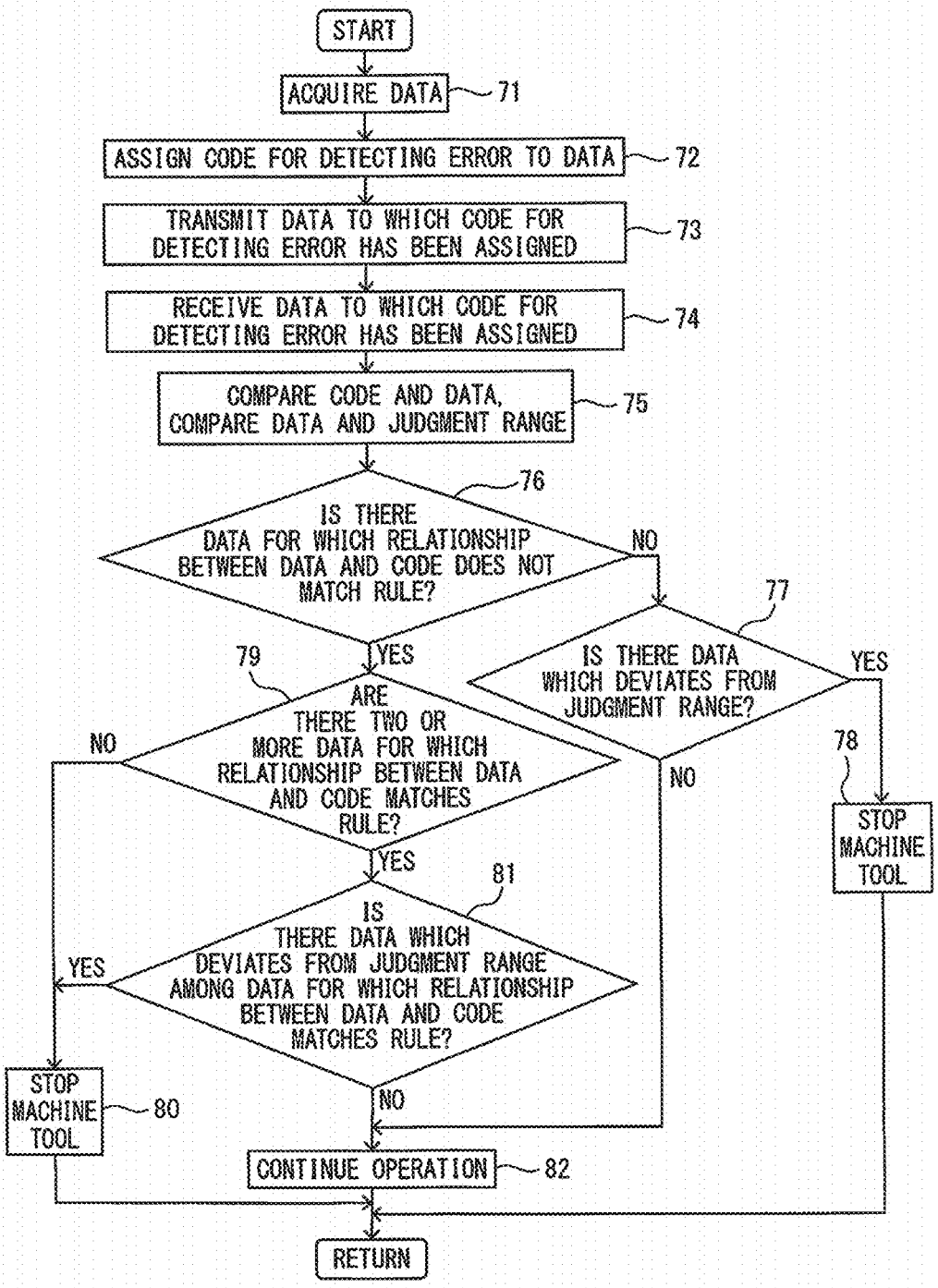
FIG. 4 is a flowchart of operation judgment control according to the embodiment.

FIG. 4 is a flowchart of the control according to the present embodiment. The control shown in FIG. 4 can be repeated at predetermined intervals.

Referring to FIG. 2 to FIG. 4, in step 71, each of the sensors 32a, 32b, 32c detects the variable related to the rotational speed of the motor 31. The transmission processors 33a, 33b, 33c acquire the rotational speed as data using the outputs of the respective sensors 32a, 32b, 32c. In step 72, the transmission processors 33a, 33b, 33c assign error detection comes to the data. In step 73, the transmission processors 33a, 33b, 33c transmit the data to which the error detection codes have been assigned.

In step 74, the reception processors 34a, 34b, 34c receive the data to which the error detection codes have been assigned. In step 75, each of the reception processors 34a, 34b, 34c judges whether the relationship between the data and the error detection code matches a predetermined rule. Furthermore, each of the reception processors 34a, 34b, 34c determines whether the data is within the judgment range. Further, the second reception processor 34b and the third reception processor 34c transmit judgment results to the first reception processor 34a.

In step 76, the first reception processor 34a determines whether there is data for which the relationship between the data and the error code does not match the rule. In step 76, when the relationship between the data and the error detection code matches the rule for all of the data, the control proceeds to step 77.

In step 77, the first reception processor 34a determines whether the plurality of sets of data include data which deviates from the judgment range. In step 77, when there is even one piece of data which deviate from the judgment range, the control proceeds to step 78. In step 78, the first reception processor 34a determines that the machine tool 1 should be stopped. The first reception processor 34a transmits a command for stopping the machine tool 1 to the command generation unit 22, and the machine tool 1 stops.

In step 77, when there is no data which deviates from the judgment range, control proceeds to step 82. In step 82, the first reception processor 34a determines that operation should continue. The first reception processor 34a transmits a command for continuing operation to the command generation unit 22. The command generation unit 22 continues operation of the machine tool 1 based on the machining program 7.

In step 76, when there is data for which the relationship between the data and the error detection code does not match the rule, the control proceeds to step 79. In step 79, the first reception processor 34a determines whether there are two or more sets of data for which the relationship between the data and the error detection code matches the rule. In step 79, when there are less than two sets of data for which the relationship between the data and the error detection code matches the rule, the control proceeds to step 80. Like step 78, in step 80, the first reception processor 34a stops the machine tool 1.

In step 79, when there are two or more sets of data for which the relationship between the data and the error detection code matches the rule, the control proceeds to step 81. In step 81, the first reception processor 34a determines whether there is data which deviates from the judgment range among the data for which the relationship between the data and the error detection code matches the rule. In step 81, when there is data which deviates from the judgment range, the control proceeds to step 80. The first reception processor 34a stops the machine tool 1.

In step 81, when there is no data which deviates from the judgment range among the data for which the relationship between the data and the error detection code matches the rule, the control proceeds to step 82. In this case, the first reception processor 34 can determine that the driving state of the motor 31 is normal and a part of the data transmission mechanisms is abnormal. In step 82, the first reception processor 34a determines that operation should be continued, and transmits the judgment results to the command generation unit 22. The command generation unit 22 continues operation of the machine tool 1 based on the machining program 7. It should be noted that when the operation judgment unit 23 determines that the driving state of the motor 31 is normal and a part of the data transmission mechanisms is abnormal, information indicating the abnormality of the part of the data transmission mechanisms may be displayed on a display unit such as a display panel.

In the control according to the present embodiment, when the driving state of the drive device is normal and there is an abnormality in the data transmission mechanisms, stoppage of the operation of the drive device or device including the drive device can be suppressed. As a result, a reduction in the utilization rate of the drive device or device including the drive device can be suppressed.

Though the transmission processors 33a, 33b, 33c as the transmission units assign error detection codes for detecting the error in data in the embodiment described above, the embodiment is not limited to this. The transmission processors 33a, 33b, 33c can assign correction codes for detecting the error in the data and for correcting the error, and can transmit the data. Examples of correction codes include ECC (Error Correction Code) and Hamming Code.

Figure 5:
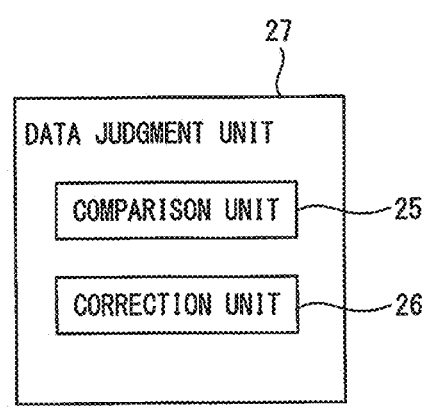
FIG. 5 is a block diagram of another data judgment unit according to the embodiment.

FIG. 5 is a block diagram of another data judgment unit according to the present embodiment. In addition to the comparison unit 25, the data judgment unit 27 includes a correction unit 26. The comparison unit 25 judges whether the relationship between the data and the correction code matches the rule. When the comparison unit 25 determines that the relationship between the correction code and the data does not match the rule, the correction unit 26 corrects the data based on the correction code.

Referring to FIG. 2, in the present embodiment, the reception unit functions as the correction unit 26. The reception processors 34a, 34b, 34c function as correction unit 26. The reception processors 34a, 34b, 34c function as the correction unit 26 of the data judgment unit 27 by being driven in accordance with the machining program 7. The correction unit is not limited to this form. In addition to a processor which receives data, a processor or an integrated circuit which has a function for judging data may be used.

Each of the reception processors 34a, 34b, 34c corrects the data when the relationship between the data and the correction code does not match the rule. When the correction unit 26 can entirely correct the data, the machine controller 2 can execute control using the corrected data. For example, the operation judgment control according to the present embodiment can be executed using corrected data.

Even if correction is performed based on the correction code, the data may not be entirely corrected in some cases. In the correction in which the correction code is used, errors of a certain degree may be corrected. For example, random errors in which few sporadic errors occur can be easily corrected. However, for burst errors in which a large number of errors occur in a short period, all of the errors may not be corrected in some cases, even if correction is performed based on the correction code.

When the data has been corrected, each of the reception processors 34a, 34b, 34c judges whether the data has been entirely corrected. For example, the reception processor 34a, 34b, 34c judges whether the relationship between the corrected data and the error code matches the rule. The first reception processor 34a serving as the operation judgment unit 23 receives judgment results from the second reception processor 34b and the third reception processor 34c.

The first reception processor 34a can execute the aforementioned operation judgment control when there is data which has not been entirely corrected. The data which has not been entirely corrected is assumed to be data for which the relationship between the data and correction code does not match the rule, and operation judgment control is performed. In the present embodiment, when the relationship between the data and the code for detecting the error does not match the rule, control is executed without the use of such data.

The operation judgment control according to the present embodiment is particularly useful for ensuring the safety of an operator present around the device, and for preventing damage to objects arranged around the device. For example, when the table of a machine tool is moved at a predetermined speed or more, there is a risk of collision with the operator. The operation judgment control according to the present embodiment is suitable in the control of a motor which moves such a component.

Though a machine tool has been described as an example of the device in the present embodiment, the embodiment is not limited to this, and any device can be employed. Examples of the device include a robot which performs predetermined operations such as an articulated robot, and a transportation carriage which travels along the ground in order to move a workpiece or a robot. In such devices, an emergency stop may be executed in some cases. The mechanisms of the present embodiment can be applied to the data transmission mechanisms for executing the emergency stop.

Though the transmission processors and the reception processors are connected by communication lines in FIG. 2 and FIG. 3 described above, the embodiment is not limited to this. Even if data transmission is performed wirelessly, the error in the data may occur in some cases due to the influence of noise or the like. The control according to the present embodiment can also be applied to a device which performs such wireless data transmission.

Figure 6:
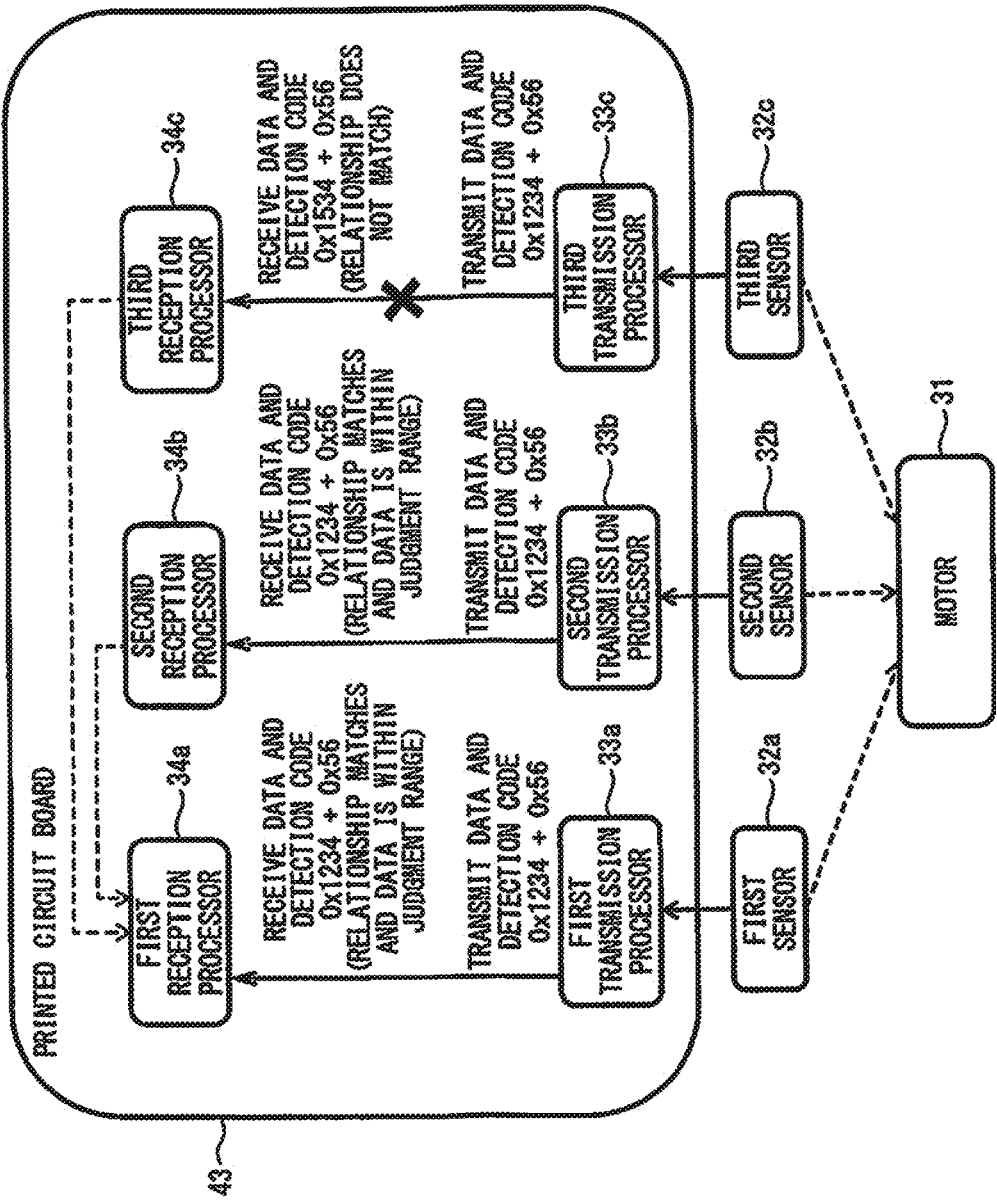
FIG. 6 is a schematic diagram for illustrating other data transmission mechanisms according to the embodiment.

FIG. 6 is a schematic diagram detailing alternative data transmission mechanisms according to the present embodiment. In the embodiment shown in FIG. 2 and FIG. 3 described above, the transmission processors 33a, 33b, 33c as transmission units and the reception processors 34a, 34b, 34c as reception units are arranged on different printed circuit boards 41, 42. In the data transmission mechanisms shown in FIG. 6, the transmission processors 33a, 33b, 33c and the reception processors 34a, 34b, 34c are arranged on a shared printed circuit board 43. The data transmission paths from the transmission processors 33a, 33b, 33c to the reception processors 34a, 34b, 34c are constituted by wiring formed on the surface of the printed circuit board 43. In this case, the wiring may become disconnected or may be influenced by noise. For example, the influence of noise may be exerted on the data due to the influence of stray capacitance present in the capacitor or electrical circuit arranged on the printed circuit board. In this case, the operation judgment control according to the present embodiment can be executed.

According to an aspect of the present disclosure, a device which can judge abnormality of the driving state of a drive device can be provided.

In the control described above, the order of the steps can be appropriately changed as long as the functions and operations thereof remain unchanged.

The above embodiments can be appropriately combined. In the drawings described above, identical or equivalent portions have been assigned the same codes. It should be noted that the embodiments described above are exemplary and do not limit the present invention. Furthermore, the embodiments include the modifications of the embodiments shown in the claims.

The invention claimed is:

1. A device, comprising:
at least three mutually independent data transmission mechanisms which transmit a driving state for a same drive device which drives a component of the device, and
a controller which controls driving of the drive device, wherein
each of the data transmission mechanisms includes:
a sensor which acquires a variable related to the driving state of the drive device,
a transmission unit which assigns a code for detecting an error to data acquired from output of the sensor and transmits the data, and
a reception unit which receives the data to which the code for detecting the error has been assigned,
the controller includes:
a data judgment unit which determines whether a relationship between the data and the code for detecting the error in the data transmitted from the data transmission mechanism matches a predetermined rule, and an operation judgment unit which executes operation judgment control for judging whether operation of the drive device is continued, and when there is data for which the relationship between the data and the code for detecting the error does not match the predetermined rule, the operation judgment control includes:

control for determining that the operation is continued in a case in which there are at least two pieces of data for which the relationship between the data and the code for detecting the error matches the predetermined rule and all of the at least two pieces of data are within a predetermined judgment range, and control for determining that the drive device is stopped in a case in which at least one of the pieces of data for which the relationship between the data and the code for detecting the error matches the predetermined rule deviates from the predetermined judgment range.

2. The device according to claim 1, wherein the transmission units assign correction codes for detecting errors and for correcting errors to the data, and transmit the data, the data judgment unit includes a correction unit which corrects the data based on the correction code when the relationship between the data and the correction code does not match the predetermined rule, and the data judgment unit judges whether the data has been fully corrected by the correction unit, and the operation judgment unit executes the operation judgment control when not all of the data has been corrected by the correction unit.

3. The device according to claim 1, wherein the drive device is a motor which moves the component of the device, and the sensors detect variables related to rotational speed of the motor.

4. The device according to claim 1, wherein the transmission units of the at least three mutually independent data transmission mechanisms are arranged on a single first printed circuit board, and the reception units of the at least three mutually independent data transmission mechanisms are arranged on a single second printed circuit board.

5. The device according to claim 1, wherein the transmission units and the reception units of the at least three mutually independent data transmission mechanisms are all arranged on a single printed circuit board.

* * * * *